United States Patent [19]

Sakamoto et al.

[11] Patent Number: 4,773,224

[45] Date of Patent: Sep. 27, 1988

[54] PORTLESS TYPE MASTER CYLINDER DEVICE WITH NON RETURN VALVE AND RESTRICTED PASSAGE IN PARALLEL BETWEEN PRESSURE CHAMBER AND FLUID RESERVOIR

[75] Inventors: Shigeru Sakamoto; Kenji Shirai; Haruo Sugimoto; Masaaki Okuyama, all of Toyota, Japan

[73] Assignee: Toyota Jidosha Kabushiki Kaisha, Aichi, Japan

[21] Appl. No.: 918,971

[22] Filed: Oct. 15, 1986

[30] Foreign Application Priority Data

Oct. 18, 1985 [JP] Japan ............................... 60-232790
Feb. 3, 1986 [JP] Japan ................................ 61-21733

[51] Int. Cl.⁴ ............................................. B60T 11/20
[52] U.S. Cl. .......................................... 60/589; 60/585
[58] Field of Search ............... 60/592, 589, 588, 585, 60/578, 574; 137/513.3

[56] References Cited

U.S. PATENT DOCUMENTS

| | | |
|---|---|---|
| 4,267,697 | 5/1981 | Hodkinson . |
| 4,445,333 | 5/1984 | Coleman ...................... 137/513.3 X |
| 4,492,082 | 1/1985 | Belart . |
| 4,550,567 | 11/1985 | Schaefer . |
| 4,621,498 | 11/1986 | Schaefer ........................... 60/589 X |
| 4,640,098 | 2/1987 | Brademeyer et al. ................. 60/585 |

FOREIGN PATENT DOCUMENTS 56-135348 10/1981 Japan .
57-41247 3/1982 Japan .
57-194150 11/1982 Japan ..................... 60/585
59-96045 6/1984 Japan .

Primary Examiner—A. Michael Chambers
Assistant Examiner—John C. Fox
Attorney, Agent, or Firm—Parkhurst, Oliff & Berridge

[57] ABSTRACT

In this portless type master cylinder device, a cylinder bore is formed in a body thereof, and a piston member is fitted in the cylinder bore and is slidably movable from an initial axial position therein and defines a pressure chamber in cooperation with the cylinder bore. An intake valve communicates between the cylinder chamber and the fluid reservoir via a fluid flow path, and is opened when the piston member is in its initial axial position while it is closed when the piston member moves through more than a determinate relatively small axial distance from its initial axial position. Intermediately along the fluid flow path between the intake valve and the fluid reservoir, there are provided in parallel a non return valve which allows substantially free flow of fluid from the fluid reservoir to the intake valve but not substantially in the reverse direction, and a means for allowing flow of fluid from the intake valve to the fluid reservoir with a relatively high flow resistance being presented to the flow. Thereby, the stroke of the piston member has a much reduced inactive initial stroke portion, as compared with other portless type master cylinder devices, and the operational feeling of the master cylinder device is greatly improved.

4 Claims, 5 Drawing Sheets

PORTLESS TYPE MASTER CYLINDER DEVICE WITH NON RETURN VALVE AND RESTRICTED PASSAGE IN PARALLEL BETWEEN PRESSURE CHAMBER AND FLUID RESERVOIR

BACKGROUND OF THE INVENTION

The present invention relates to a master cylinder device for use, for example, in a braking system or a clutching system for an automotive vehicle, and more particularly relates to a portless type such master cylinder device which is improved with regard to its operational and feeling characteristics.

The present invention has been described in Japanese Patent Application Ser. Nos. 60-232790 (1985) and 61-021733 (1986), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Further, the present inventors wish hereby to attract the attention of the examining authorities to copending patent application Ser. No. 918,974, which may be considered to be material to the examination of the present patent application.

In, for example, Japanese Patent Laying Open Publication Serial No. 57-41247 (1982) and Japanese Patent Laying Open Publication Serial No. 59-96045 (1984), neither of which is it intended hereby to admit as prior art to the present patent application except to the extent in any case required by applicable law, there is disclosed a portless type master cylinder device, for example for a braking or clutching system for a vehicle such as an automobile, which has a body within which is formed a cylinder bore, with a piston member being fitted in the cylinder bore so as to be slidably movable from an initial axial position therein which said piston member is at when not impelled by the brake or clutch pedal of the vehicle to which this master cylinder device is fitted, a pressure chamber being defined by said piston member in cooperation with the cylinder bore, and in which an intake valve communicates between the cylinder chamber and the fluid reservoir, this intake valve being opened when the piston member is in its initial axial position while said intake valve is closed when the piston member moves through more than a determinate relatively small axial distance from its said initial axial position. Thereby, when the brake or clutch pedal of the vehicle is not substantially depressed and accordingly the piston member is in its initial axial position, the intake valve allows brake or clutch fluid to be supplied freely from the fluid reservoir into the cylinder chamber, thus to replenish said cylinder chamber. However, when the brake or clutch pedal of the vehicle is progressively depressed, the piston member is progressively displaced from its said initial axial position so as to reduce the volume of said cylinder chamber, and initially said intake valve only slowly and progressively approaches the closed condition, to become completely closed only when said piston member has moved through said determinate relatively small but yet somewhat considerable axial distance from its said initial axial position. Thereafter, the brake or clutch fluid in said pressure chamber is squeezed, to be ejected therefrom towards the braking or clutching system of the vehicle in a per se conventional manner. Such a portless type master cylinder device dispenses with any port or ports in the side of the cylinder bore which are required to be traversed by the land or lands of the piston member during its stroke, substituting the action of the above described valve for the action of said port or ports, and accordingly the durability of the master cylinder device is enhanced.

However, this type of portless type master cylinder device is fraught with problems which will now be outlined. As outlined above, as the brake or clutch pedal of the vehicle is progressively depressed and the piston member is progressively displaced from its said initial axial position so as to reduce the volume of said cylinder chamber, since initially said intake valve only slowly and progressively approaches the closed condition until said piston member has moved through said determinate relatively small but yet somewhat considerable axial distance from its said initial axial position, thereby during this initial movement of the piston member no actuation of the braking or clutching system for the vehicle is performed, and instead brake or clutch fluid is expelled from the pressure chamber back towards the fluid reservoir, which is quite inappropriate at this time. This causes the phenomenon of so called empty or inactive piston stroke, and increase in the pressure in the pressure chamber is delayed to a unduly great extent from the position and the time that the brake or clutch pedal of the vehicle is initially depressed. Thus, the operational feeling for the brake or clutch pedal is worsened, and a good brake or clutch response cannot be obtained.

SUMMARY OF THE INVENTION

The inventors of the present invention have considered the various problems detailed above in the case of a portless type master cylinder, with the end in view of preserving the good characteristics of said portless type of master cylinder device while overcoming the drawbacks thereof.

Accordingly, it is the primary object of the present invention to provide a portless type master cylinder device, which avoids the problems detailed above.

It is a further object of the present invention to provide such a portless type master cylinder device, the inactive or empty stroke initial portion of the piston member of which is much reduced.

It is a further object of the present invention to provide such a portless type master cylinder device, which has a better operational feeling.

It is a yet further object of the present invention to provide such a portless type master cylinder device, which provides an operational feeling comparable to that of a conventional type master cylinder device which is not of the portless type.

It is a yet further object of the present invention to provide such a portless type master cylinder device, which has different operational characteristics when it is operated quickly from its operational characteristics when it is operated slowly.

It is a yet further object of the present invention to provide such a portless type master cylinder device, in which a difference is present between the dynamic stroke and the static stroke of its piston member.

It is a yet further object of the present invention to provide such a portless type master cylinder device, in which the pressure in a pressure chamber thereof, as its piston member is progressively moved, increases steadily and at a steadily varying rate.

It is a yet further object of the present invention to provide such a portless type master cylinder device, which provides good and smooth response.

It is a yet further object of the present invention to provide such a portless type master cylinder device, which does not unduly delay increase in the pressure in the pressure chamber thereof from the position and the time that a brake or clutch pedal drivingly connected to said master cylinder device is initially depressed.

According to the most general aspect of the present invention, these and other objects are attained by a portless type master cylinder device, comprising: (a) a body within which is formed a cylinder bore; (b) a piston member which is fitted in said cylinder bore and is slidably movable from an initial axial position therein and which defines a pressure chamber in cooperation with said cylinder bore; (c) a fluid reservoir; (d) an intake valve which communicates between said cylinder chamber and said fluid reservoir via a fluid flow path, and which is opened when said piston member is in its said initial axial position while it is closed when said piston member moves through more than a determinate relatively small axial distance from its said initial axial position; and: (e) intermediately along said fluid flow path between said intake valve and said fluid reservoir, provided in parallel: (e1) a non return valve which allows substantially free flow of fluid from said fluid reservoir to said intake valve but not substantially in the reverse direction; and: (e2) a means for allowing flow of fluid from said intake valve to said fluid reservoir with a relatively high flow resistance being presented to said flow.

According to such a portless type master cylinder device as specified above, since, even although the intake valve requires a certain degree of stroke (said determinate relatively small axial distance) before it is fully closed, and therefore said intake valve will not be closed until the piston member has moved through said determinate relatively small axial distance, nevertheless during this initial piston member movement the flow of fluid from the pressure chamber through the still open intake valve to the fluid reservoir is substantially prevented by the non return valve, not being greatly allowed by the means for allowing flow of fluid from said intake valve to said fluid reservoir due to its relatively high flow resistance, and hence even while the piston member is thus executing its initial movement and before the intake valve is closed a satisfactorily increasing pressure will be put upon the fluid in the pressure chamber. Accordingly, the ineffective or empty stroke of the piston member is minimized, response of the master cylinder device is improved, and the operational feeling provided thereby is ameliorated.

Further, because as described above during the initial movement of the piston member, until the intake valve is completely closed, because the flow of fluid from the pressure chamber through the intake valve and through the means for allowing flow of fluid from said intake valve to said fluid reservoir is allowed although very much restricted, thereby even in this portless type master cylinder device, in the same way as in a conventional type master cylinder device which is not of the portless type, a difference is present between the dynamic stroke and the static stroke of the piston member; in other words its operational characteristics when it is operated quickly are different from its operational characteristics when it is operated slowly. Accordingly, at the instant that the intake valve becomes closed, a sudden rise in the pressure in the pressure chamber, or rather a discontinuity in its rate of rise, is avoided, and smoother operation of this master cylinder device is thus available. Thus this portless type master cylinder device provides an operational feeling comparable to that of a conventional type master cylinder device which is not of the portless type.

Further, according to a particular specialization of the present invention, the above specified and other objects may be more particularly attained by a portless type master cylinder device as specified above, wherein said non return valve comprises a valve seat formed with a valve aperture, a valve element which cooperates with said valve seat to open or close said valve aperture, and a means for biasing said valve element away from said valve seat so as to open said valve aperture; said intake valve being provided on the side of said valve seat towards said valve element and said fluid reservoir being provided on the side of said valve seat away from said valve element; and wherein, when more than a relatively small volume of fluid flow occurs through said non return valve from the side of said intake valve towards said fluid reservoir, said fluid flow impels said valve element, against the action of said biasing means which is overcome, to press said valve element against said valve seat so as to close said valve aperture therein. Alternatively, according to an alternative particular specialization of the present invention, the above specified and other objects are more particularly attained by a portless type master cylinder device of the type specified above, wherein said non return valve comprises a valve seat formed with a valve aperture, a valve element which cooperates with said valve seat to open or close said valve aperture, and a means for biasing said valve element towards said valve seat so as to close said valve aperture; said intake valve being provided on the side of said valve seat towards said valve element and said fluid reservoir being provided on the side of said valve seat away from said valve element; and wherein, when the pressure on the side of said non return valve towards said fluid reservoir becomes substantially greater than the pressure on the side of said non return valve towards the side of said intake valve, said fluid flow impels said valve element, against the action of said biasing means which is overcome, to pull said valve element away from said valve seat so as to open said valve aperture therein. Either of these constructions has its own particular merits, as will be detailed later herein.

Further, according to yet another particular specialization of the present invention, the above specified and other objects are more particularly attained by a portless type master cylinder device of the type first specified above, wherein said means for allowing flow of fluid from said intake valve to said fluid reservoir with a relatively high flow resistance being presented to said flow is a relatively narrow passage; and in this case said relatively narrow passage may be formed in said body of said master cylinder device. On the other hand, in either of the cases detailed secondly and thirdly above, said means for allowing flow of fluid from said intake valve to said fluid reservoir with a relatively high flow resistance being presented to said flow may be a relatively narrow passage formed in said valve element of said non return valve; and in this case said relatively narrow passage formed in said valve element of said non return valve may be an aperture formed through said valve element from its one side to its other side, or alternatively may be a groove formed on the side of said valve element which cooperates with said valve seat and which permits a certain relatively small amount of leakage of said non return valve even when said valve element thereof is pressed against said valve seat thereof by said biasing means. Finally, in the most general concept of the portless type master cylinder device of the present invention as first detailed above, said non return valve desirably but not absolutely may be located within a fluid reservoir port formed in said body of said master cylinder device.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

FIG. 4 is an enlarged longitudinal sectional view, similar to a portion of FIG. 2 for the first preferred embodiment, showing a non return valve construction incorporated in the second preferred embodiment of the portless type master cylinder device of the present invention;

DESCRIPTION OF THE PREFERRED EMBODIMENTS

The present invention will now be described with reference to the preferred embodiments thereof, and with reference to the figures.

THE FIRST PREFERRED EMBODIMENT

Figure 1:
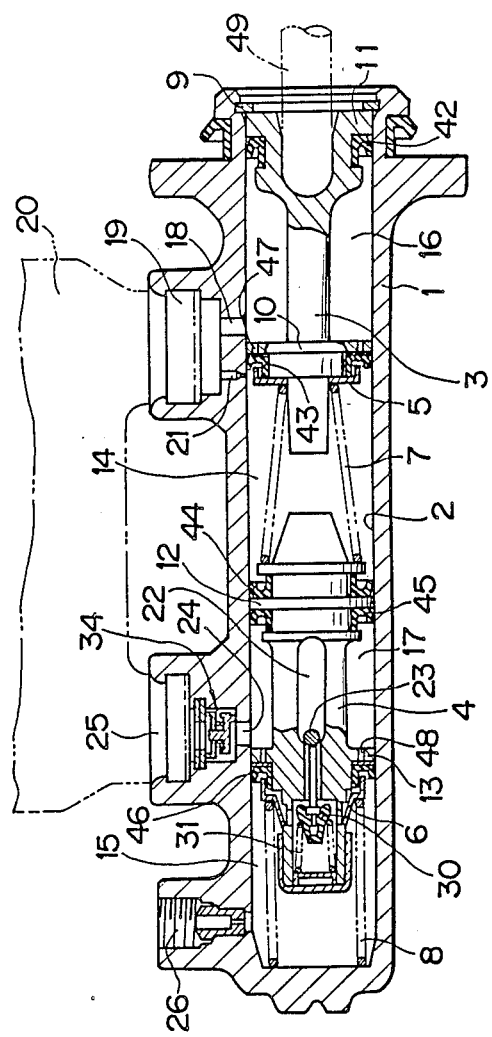
FIG. 1 is a longitudinal sectional view of the first preferred embodiment of the portless type master cylinder device of the present invention, which is a tandem type master cylinder for use with a dual type braking system of a vehicle.
Figure 2:
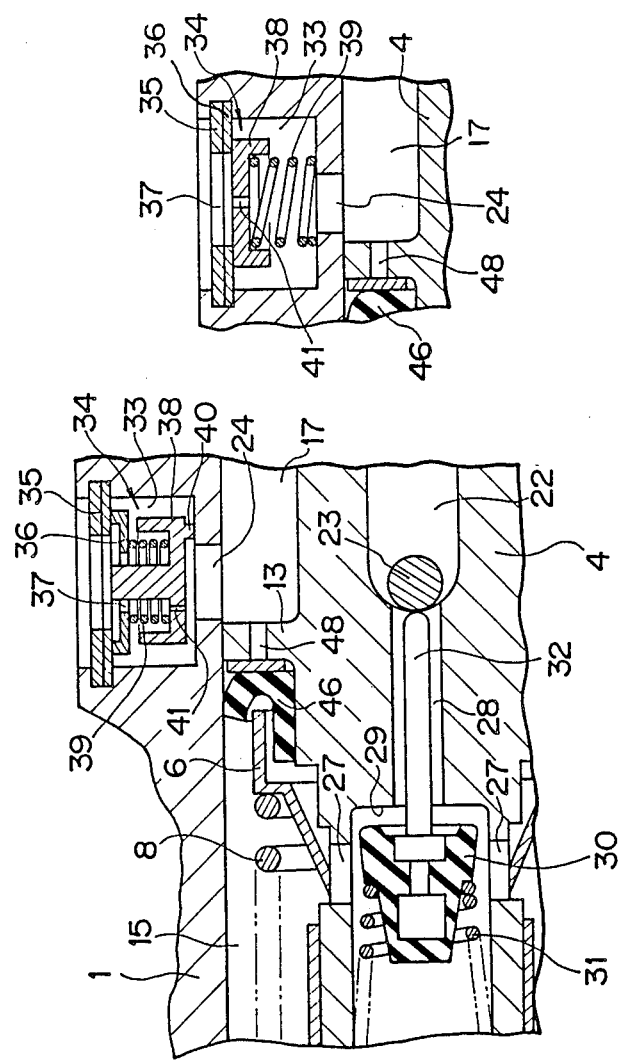
FIG. 2 is an enlarged longitudinal sectional view of an end portion of a second piston member of said first preferred embodiment portless type master cylinder device and of a non return valve construction incorporated therein.

FIGS. 1 and 2 show the first preferred embodiment of the portless type master cylinder device of the present invention; and, particularly, FIG. 1 is a longitudinal sectional view of said first preferred embodiment, which is a tandem type master cylinder for use with a dual type braking system of a vehicle. In this figure, the reference numeral 1 designates the body of said master cylinder device, and said master cylinder body 1 is formed with a cylinder bore 2, having a closed end and an open end, and within which there are provided a first piston member 3 and a second piston member 4 both slidably mounted in said cylinder bore 2 so as to be movable to and fro along the axial direction thereof. The first piston member 3 is the one fitted less deeply in said cylinder bore 2 and on the side towards its open end, while the second piston member 4 is the one fitted more deeply in said cylinder bore 2 and on the side towards its closed end.

The first piston member 3 is formed with two lands 10 and 11 on which its slides in said cylinder bore 2, and on the inner end of said first piston member 3 there is mounted a retainer or cap 5. Between this retainer 5 and the outer end of the second piston member 4 there is fitted a compression coil spring 7 which thus biases apart said first piston member 3 and said second piston member 4, i.e. which biases said first piston member 3 rightwards in the cylinder bore 2 from the point of view of FIG. 1, outwards from the cylinder bore 2, while simultaneously biasing said second piston member 4 leftwards in said cylinder bore 2 from the point of view of said figure, inwards into said cylinder bore 2. And the second piston member 4 is formed with two lands 12 and 13 on which it slides in said cylinder bore 2, and on the inner end of said second piston member 4 there is mounted another retainer or cap 6. Between this retainer 6 and the closed inner end of the cylinder bore 2 there is fitted another compression coil spring 8 which thus biases said second piston member 4 leftwards in the cylinder bore 2 from the point of view of FIG. 1, outwards from the cylinder bore 2. And a depression is formed in the left end in the figure of the first piston member 3, into which is fitted the end of a push rod 49, the other end of which is connected to a brake pedal of a vehicle for being depressed by the foot of a driver of said vehicle, although these arrangements are not particularly shown. Thus, when said accelerator pedal is depressed by the foot of the driver, and thereby said push rod 49 forces the first piston member 3 leftwards in the figure in the cylinder bore 3, the second piston member 4 becomes thereby positioned at an intermediate point in the cylinder bore 2 according to a balance which is struck between the opposing spring forces of the compression coil springs 7 and 8 and the pressures in various chambers defined in said cylinder bore which will be explained shortly. A stopper ring 9 provided at the open end of the cylinder bore 2 prevents the first piston member 3 from coming out of said open end.

Referring to the orientation of the parts shown in FIG. 1, in the cylinder bore 2 between the left land 10 of the first piston member 3 and the right land 12 of the second piston member 4 there is defined a first pressure chamber 14, and in said cylinder bore 2 between the left land 13 of the second piston member 4 and the closed end of the cylinder bore 2 there is defined a second pressure chamber 15. And in said cylinder bore 2 between the right land 9 and the left land 10 of said first piston member 3 there is defined a first reservoir connection chamber 16, and in said cylinder bore 2 between the right land 13 and the left land 13 of the second piston member 4 there is defined a second reservoir connection chamber 17.

A fluid reservoir port 18 is formed in the side of said cylinder bore 2 in such a position that, whatever be the axial position of the first piston member 3 in the cylinder bore 2, the first reservoir connection chamber 16 is communicated to said fluid reservoir port 18 and therethrough with a reservoir connection port 19 which leads to a brake fluid reservoir 20 only schematically shown. At a position in said cylinder bore 2 somewhat to the left in the figure of said fluid reservoir port 18 there is also formed a somewhat restricted orifice port 21, which communicates the first pressure chamber 14 to said reservoir connection port 19 and therethrough to said brake fluid reservoir 20, when and only when the first piston member 3 is in its extreme position to the right from the point of view of FIG. 1 in the cylinder bore 2, as shown in that figure; but, when said first piston member 3 is displaced from its said extreme position to the right in the cylinder bore 2 to any substantial extent to the left, then communication of said first pressure chamber 14 to said reservoir connection port 19 and therethrough to said brake fluid reservoir 20 is interrupted by the intervention of the land 10 of said first piston member 3. Further in the body 1 of this master cylinder device there is formed a brake fluid outlet passage opening to the first pressure chamber 14 for receiving brake fluid compressed therein and for transmitting said compressed brake fluid to one braking system of the vehicle to which this master cylinder device is fitted; but this brake fluid outlet passage is not shown in the figures.

The second piston member 4 is formed with a slot 22 extending along its axial direction, and a stopper pin 23 is fixed to the body 1 of this master cylinder device and protrudes into the cylinder bore 2 so as to pass through and be engaged into this slot 22. Thus the travel to the right as seen in FIG. 1 of the second piston member 4 under the influence of the spring force of the compression coil spring 8 is limited to the position thereof shown in FIG. 1 by the pin 23 coming into contact with the left end in FIG. 1 of the slot 22. A fluid reservoir port 24 is formed in the side of the cylinder bore 2 in such a position that, whatever be the axial position of the second piston member 4 in the cylinder bore 2, the second reservoir connection chamber 17 is communicated to said fluid reservoir port 24 and further therethrough, via a passage 33 which is equipped with a non return valve construction 34 which will be described shortly, is communicated with a reservoir connection port 25 which leads to the brake fluid reservoir 20. Further in the body 1 of this master cylinder device there is formed a brake fluid outlet passage 26 opening to the second pressure chamber 15 for receiving brake fluid compressed therein and transmitting said compressed brake fluid to the other braking system of the vehicle to which this master cylinder device is fitted.

Referring particularly now to the enlarged longitudinal sectional view of the left end portion of the second piston member 4 shown in FIG. 2, in said second piston member 4 there is formed a longitudinally extending hole 28, one end of which opens to a valve seat portion 29 defined on said left end piston member portion and therethrough is communicated via holes 27 formed in the previously mentioned retainer or cap 6 to the second pressure chamber 15 when said valve seat portion 29 is unobstructed, and the other end of which opens to the slot 22 and therethrough is communicated to the second reservoir connection chamber 17. A valve element 30 is mounted in a cavity defined between the retainer 6 and the end of the second piston member 4, and said valve element 30 is biased to the right in the figure against said end of said second piston member 4 by a compression coil spring 31 fitted between said valve element 30 and said retainer 6, so as to close the valve seat portion 29 and so as thereby to interrupt communication therethrough from the second pressure chamber 15 to the second reservoir connection chamber 17. A push rod 32 is provided, of length slightly longer than the length of the longitudinally extending hole 28, and its one end is seated in the valve element 30 while its other end protrudes into said longitudinally extending hole 28. Thereby, when the second piston member 4 is in its extreme position to the right as seen in FIG. 2 in the clyinder bore 2, with the pin 23 abutting against the left end of the slot 22, then the right end of this push rod 32 presses against the pin 23, and this pushes the push rod 32 slightly to the left with respect to the second piston member 4, so as to lift the valve element 30 off from the valve seat 29 and so as to establish communication between the second pressure chamber 15 and the second reservoir connection chamber 17; but, on the other hand, when the second piston member 4 is in any other position even relatively slightly displaced to the left in said cylinder bore 2, with the pin 23 thus not abutting against the left end of the slot 22, then the right end of this push rod 32 no longer presses against the pin 23, and thus the push rod 32 is no longer pressed at all to the left with respect to the second piston member 4, so that the valve element 30 is left free to be biased by the compression coil spring 31 against the valve seat 29, so as to interrupt communication between the second pressure chamber 15 and the second reservoir connection chamber 17.

In the fluid passage 33 which communicates between the fluid reservoir port 24 and the reservoir connection port 25 there is fitted the previously mentioned non return valve construction 34. This non return valve construction 34 comprises a valve seat member 36 formed with a valve port 37 and fixed to the master cylinder body 1 by a retainer 35, a valve element 38 which selectively either can be displaced downwards as seen in FIG. 2 from said valve seat member 36 so as to open said valve port 37 or can be displaced upwards as seen in FIG. 2 against said valve seat member 36 so as in such a circumstance to close the valve port 37, and a compression coil spring 39 which biases said valve element 38 in the valve opening direction, that is to say downwards in FIG. 2. In the static state when no substantial brake fluid flow is taking place through the fluid passage 33, therefore, under the biasing action of the compression coil spring 39, the valve element 38 is biased downwards in FIG. 2 so as to open the valve port 37, and in this condition a small projection 40 formed on the lower side in FIG. 2 of said valve element 38 presses against a projecting portion of the brake master cylinder body 1 and keeps the fluid reservoir port 24 open and communicating with the fluid passage 33 and thence with the reservoir connection port 25; and thereby the substantially free flow of brake fluid through the fluid passage 33 from the reservoir connection port 25 to the fluid reservoir port 24 through the non return valve construction 34 is allowed. On the other hand, when even a relatively small flow of brake fluid starts to occur in the reverse direction through this non return valve construction 34, i.e. from the fluid reservoir port 24 to the reservoir connection port 25, then this flow pushes against the lower side in FIG. 2 of the valve element 38 and raises said valve element 38 against the biasing action of the compression coil spring 39 which is overcome, so as to press said valve element 38 against the valve seat member 36 so as to close the valve port 37 and so as substantially to intercept said brake fluid flow. And a restricted orifice 41 is also pierced through the valve element 38, so as nevertheless to allow a certain very restricted brake fluid flow with a relatively high flow resistance through said valve element 38 from the fluid reservoir port 24 to the reservoir connection port 25, even in this valve closed operational condition; the reason for this arrangement will be made clear hereinafter.

The right land 11 in FIG. 1 of the first piston member 3 is fitted with an annular seal element 42 made of an elastomer such as rubber, which seals between the first reservoir connection chamber 16 and the outside. And the left land 10 in FIG. 1 of said first piston member 3 is fitted with another annular seal element 43 also made of an elastomer such as rubber, which seals between the first reservoir connection chamber 16 and the first pressure chamber 14. Through said left land 10 of said first piston member 3 there are formed a plurality of small orifices 47, which allow brake fluid to flow from the first reservoir connection chamber 16 past the seal element 43 which provides a non return action into the first pressure chamber 14, but not in the reverse direction. The right land 12 in FIG. 1 of the second piston member 4 is fitted on its right side with another annular seal element 44 and on its left side with yet another annular seal element 45, both said seal elements 44 and 45 also being made of an elastomer such as rubber and thus together providing an effective two way seal between the second reservoir connection chamber 17 and the first pressure chamber 14. And the left land 13 in FIG. 1 of the second piston member 4 is fitted on its left side with yet another annular seal element 46, said seal element 46 also being made of an elastomer such as rubber and providing a seal between the second pressure chamber 15 and the second reservoir connection chamber 17. Through said left land 13 of said second piston member 4 there are formed a plurality of small orifices 48, which allow brake fluid to flow from the second reservoir connection chamber 17 past the seal element 46 which provides a non return action into the second pressure chamber 15, but not in the reverse direction.

This preferred embodiment of the portless type master cylinder device of the present invention operates as will be explained in the following.

When the brake pedal of the vehicle to which this master cylinder device is fitted is in the released condition and the device is in the substantially static state, then the push rod 49 does not press substantially upon the first piston member 3, and said first piston member 3 and the second piston member 4 are positioned by the biasing action of the compression coil springs 7 and 8 to their maximum positions to the right in FIG. 1 in the cylinder bore 2, as shown in FIG. 1. In this operational condition, the first pressure chamber 14 is communicated via the orifice port 21 to the reservoir connection port 19 and therethrough to the brake fluid reservoir 20. Also, as shown in FIG. 2, the pin 23 is pressing against the end of the push rod 32 and is holding the valve element 30 away from the valve seat 29, thus allowing the second pressure chamber 15 to be communicated with the brake fluid reservoir 20 via the holes 27, the valve seat 29, the longitudinal hole 28, the slot 22, the second reservoir connection chamber 17, the fluid reservoir port 24, and the passage 33 without being closed off by the non return valve construction 34 which is currently in the open state since no substantial fluid flow is occurring in this substantially static state. Thus, brake fluid from the brake fluid reservoir 20 is freely supplied to the first pressure chamber 14 and to the second pressure chamber 15 in this static state with the vehicle brake pedal being released. When from this state the brake pedal is initially pressed downwards, this causes the push rod 49 to push the first piston member 3 and to move it slightly to the left as seen in FIG. 1 from its position in that figure against the biasing force of the compression coil spring 7, and under the balance struck between the opposing biasing forces of the compression coil springs 7 and 8 the second piston member 4 likewise moves slightly to the left as seen in FIG. 1 from its position in that figure.

According to this movement, as soon as the seal element 43 passes past the orifice port 21 opening in the side of the cylinder bore 2, communication between the first pressure chamber 14 and the brake fluid reservoir 20 is interrupted, and along with further movement of the first piston member 3 the pressure in the first pressure chamber 14 rises thereafter.

Also, simultaneously with this, as the second piston member 4 is thus moved to the left as seen in FIG. 1, as soon as the pin 23 has released the end of the push rod 32 and said push rod 32 and the valve element 30 are allowed to be moved by the biasing action of the compression coil spring 31 slightly to the right as seen in FIG. 2 from their positions as shown in that figure, by this action the valve seat 29 is closed, thereby interrupting communication from the second pressure chamber 15 to the second reservoir connection chamber 17 and thus to the brake fluid reservoir 20. And thereafter along with further movement of the first piston member 3 the pressure in the first pressure chamber 14 rises. However, even before this initial motion of the second piston member 4 has fully taken place, as soon as the brake fluid in the second pressure chamber 15 is pressurized even relatively slightly and long before the pin 23 has released the end of the push rod 32 and said push rod 32 and the valve element 30 are thus moved to close the valve seat 29, some of said brake fluid in said second pressure chamber 15 is driven through the longitudinally extending hole 28 into the second reservoir connection chamber 17 and thence through the fluid reservoir port 24 and into the passage 33 and attempts to flow past the non return valve construction 34 to the brake fluid reservoir 20. At this time, by the action of said non return valve construction 34 as explained above, almost immediately the dynamic pressure of this brake fluid flow acts upon the valve element 38 and drives it upwards as seen in FIG. 2 against the biasing action of the compression coil spring 39 which is overcome, thus to close the valve port 37 in the valve seat member 36 and prevent further such brake fluid flow, except for the relatively very small such brake fluid flow that still is allowed to take place through the restricted orifice 41 from the fluid reservoir port 24 back to the brake fluid reservoir 20. Thereby, at this time, the flow of brake fluid from the second reservoir connection chamber 17 to the brake fluid reservoir 20 is restricted to a relatively extremely small amount, that is to say is throttled, and, although the valve constituted by the valve seat member 29 and the valve element 30 is still open at this relatively early stage of brake pedal depression, nevertheless the pressure in the second pressure chamber 15 rises steadily and satisfactorily. By this operation, the ineffective portion of the stroke of the second piston member 4 is reduced, as compared with the prior art described in the earlier portion of this specification.

Since the flow resistance of the passage 33 is arranged to be sufficiently greater that the flow resistance of the second pressure chamber 15 (by said passage 33 being arranged to have a smaller cross sectional area than said second pressure chamber 15), thereby, during this brake application process, even if the opening and closing stroke of the valve element 38 of the non return valve construction 34 is set to be approximately the same as the opening and closing stroke of the valve element 30 of the valve construction in the second piston member 4, nevertheless the non return valve construction 34 will close much more quickly than will said valve construction in said second piston member 4, and thereby the fluid in the second pressure chamber 15 will be effectively restricted from flowing through the longitudinally extending hole 28 and the second reservoir connection chamber 17 into the brake fluid reservoir 20, and as described above the effect that the ineffective portion of the stroke of the second piston member 4 is reduced is maintained.

Figure 3:
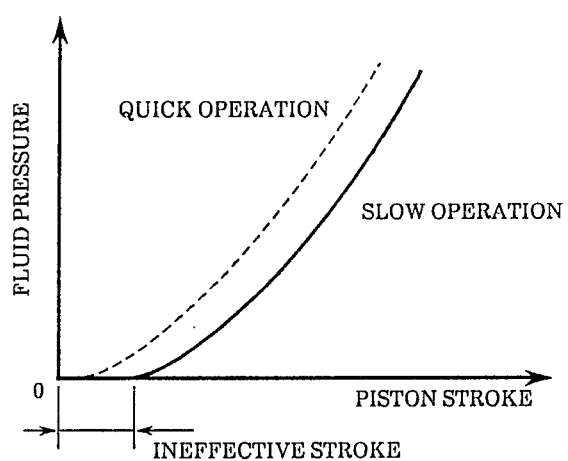
FIG. 3 is a pair of graphs showing piston member stroke against the fluid pressure produced thereby, illustrating the characteristics of this first preferred embodiment portless type master cylinder device both in the case of relatively quick brake pedal depression and in the case of relatively slow brake pedal depression.

In FIG. 3 there are shown a pair of graphs of piston stroke against brake fluid pressure, illustrating the characteristics of this first preferred embodiment of the portless type master cylinder device of the present invention: the dashed line shows the characteristics in the case of relatively quick brake pedal depression, while the solid line shows the characteristics in the case of relatively slow brake pedal depression. In other words, the dashed line shows the characteristics under dynamic conditions when the movement of the first piston member 3 and the second piston member 4 is carried out relatively rapidly, while the dotted line shows the characteristics under static conditions when the movement of the first piston member 3 and the second piston member 4 is carried out extremely slowly at a time scale large compared with the time scale on which brake fluid passes through the restricted orifice 41. As will be clear from these graphs, in the case of relatively rapid brake pedal operation, the initial portion of the movement of the brake pedal which in the prior art and in the case of very slow pedal movement constituted an ineffective pedal stroke portion, is reduced or eliminated.

At the point that the valve element 30 of the valve construction in the second piston member 4 meets the valve seat member 29 and thus closes said valve construction, since the flow of brake fluid from the second pressure chamber 15 through the second reservoir connection chamber 17 to the brake fluid reservoir 20 in the case of relatively brisk brake pedal operation is already virtually prohibited (on the time scale appropriate to this type of brake pedal application), thereby a difference arises between the dynamic stroke of the second piston member 4 and its static stroke as explained above, and also at this instant that said valve element 30 meets said valve seat member 29 a sudden rise in the brake fluid pressure in the second pressure chamber 15 is prevented (or rather a discontinuity in the slope of the rise of said pressure is prevented), and thereby a superior type of pedal operational feeling comparable to that of a conventional type of master cylinder device of conventional construction (i.e. better than that of the typical portless type of master cylinder device) is obtained.

Thereafter, as the driver presses further on the brake pedal, the first piston member 3 and the second piston member 4 are further driven to the left as seen in FIG. 1 as is per se conventional, expelling brake fluid from the first pressure chamber 14 and the second pressure chamber 15 to the two braking systems of the vehicle and applying the brakes thereof.

When the brake pedal is later released by the foot of the vehicle driver, the first piston member 3 and the second piston member 4 are allowed, under the biasing actions of the compression coil springs 7 and 8, to move back again in the rightwards direction from the point of FIG. 1 towards their positions as shown in that figure. At this time, the return flow of fluid from the outlet port 26 back into the second pressure chamber 15 is restrained and delayed by fluid resistance and so forth in the braking system (not particularly shown) connected to said outlet port 26, and hence a temporary partial vacuum state (depression below atmospheric pressure) is set up in said second pressure chamber 15, and this partial vacuum state sucks brake fluid from the brake fluid reservoir 20 through the non return valve construction 34 with is already in the valve open state, through the fluid reservoir port 24 into the second reservoir connection chamber 17, and thence through the longitudinally extending hole 28 and/or the orifices 48, pressing open either the valve element 30 and/or the seal element 46 respectively, into the second pressure chamber 15, so as to thus relieve said temporary partial vacuum state in said second pressure chamber 15. Thereby, the occurrence of a relatively high partial vacuum state in said second pressure chamber 15 is prevented.

Now, this fluid which had thus flowed from the brake fluid reservoir 20 into the second pressure chamber 15 at the initial part of the return stroke of the piston members 3 and 4 as described above, when the second piston member 4 has returned to close to its initial position as shown in FIG. 1 and the valve 30 is displaced from its valve seat 29 by the action of the pin 23 pushing on the end of the rod 32, returns through the longitudinally extending hole 28 to the second reservoir connection chamber 17. At this time point, the valve element 38 of the non return valve construction 34 is again closed by this brake fluid attempting to flow back through said non return valve construction 34 to the brake fluid reservoir 20, but, since this surplus brake fluid can gradually ooze and seep through the small orifice 41 to the brake fluid reservoir 20, the persistence of a remainder pressure in the second pressure chamber 15 after the driver of the vehicle releases the brake pedal thereof is positively prevented.

THE SECOND PREFERRED EMBODIMENT

The non return valve construction 34 incorporated in the second preferred embodiment of the portless type master cylinder device of the present invention is shown in FIG. 4, in a similar manner to a portion of FIG. 2 relating to the first preferred embodiment. In this figure, parts and gaps and spaces and so on of this second preferred embodiment which correspond to analogous parts and gaps and spaces and so on of the first preferred embodiment are denoted by reference numerals like to those utilized in FIGS. 1 and 2 relating to said first preferred embodiment.

In this second preferred embodiment the non return valve construction 34 is not formed as a normally open type of non return valve as was the case in the first preferred embodiment disclosed above, but instead is a normally closed type of non return valve. In this case, the valve element 38 of said non return valve construction 34 is pressed against the valve seat portion 36 by the biasing action of the compression coil spring 39, so as to close the valve port 37 through said valve seat portion 36 and so as to prevent the flow of brake fluid from the fluid reservoir port 24 to the brake fluid reservoir 20, except allowing said flow through the restricted orifice 41 which is again in this case formed through the valve element 38; but, when the second reservoir connection chamber 17 attempts to suck brake fluid from the brake fluid reservoir 20, then this suction almost immediately biases said valve element 38 away from the valve seat portion 36 against the biasing action of the compression coil spring 39 which is overcome, thereby to allow flow of brake fluid from said brake fluid reservoir 20 toward said fluid reservoir port 24. The same effects and benefits are obtained in this second preferred embodiment of the portless type master cylinder device of the present invention, as were obtained in the case of the first preferred embodiment described earlier.

Since the non return valve construction 34 is normally closed in this second preferred embodiment of the portless type master cylinder device of the present invention, it is even more effective in preventing flow of fluid from the fluid reservoir port 24 towards the brake fluid reservoir 20, than was the non return valve construction 34 of the first preferred embodiment described above.

THE THIRD PREFERRED EMBODIMENT

Figure 5:
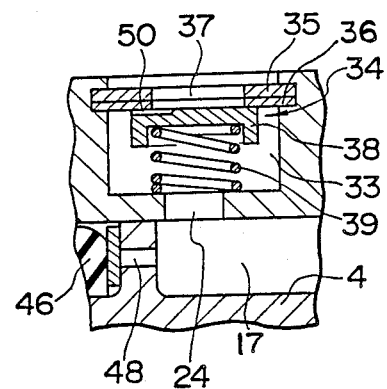
FIG. 5 is an enlarged longitudinal sectional view, similar to said portion of FIG. 2 and to FIG. 4 for the first and the second preferred embodiments respectively, showing a non return valve construction incorporated in the third preferred embodiment of the portless type master cylinder device of the present invention.

The non return valve construction 34 incorporated in the third preferred embodiment of the portless type master cylinder device of the present invention is shown in FIG. 5, in a similar manner to said portion of FIG. 2 relating to the first preferred embodiment and to FIG. 4 relating to the second preferred embodiment. Again, in this figure, parts and gaps and spaces and so on of this third preferred embodiment which correspond to analogous parts and gaps and spaces and so on of the first and second preferred embodiments are denoted by reference numerals like to those utilized in the figures relating to said first and second preferred embodiments.

In this third preferred embodiment the restricted orifice 41 incorporated in the non return valve construction 34 is no longer formed as an aperture through the valve element 38 thereof, but rather is formed as a slot shaped groove 50 inscribed on the side of said valve element 38 which mates with the valve seat portion 36 to form a seal. Thus, the integrity of this seal is subverted by a steady relatively tiny leakage through this slot or groove 50, even when the non return valve construction 34 is in its closed condition. The same effects and benefits are obtained in this third preferred embodiment of the portless type master cylinder device of the present invention, as were obtained in the case of the first and second preferred embodiments described earlier.

THE FOURTH PREFERRED EMBODIMENT

Figure 6:
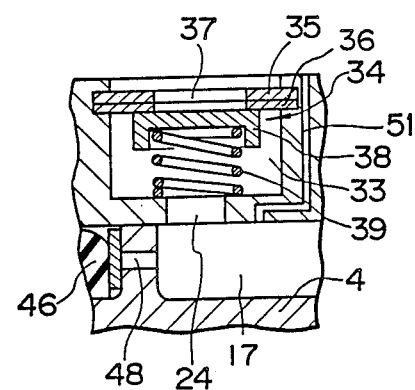
FIG. 6 is an enlarged longitudinal sectional view, similar to said portion of FIG. 2 and to FIGS. 4 and 5 for the first through the third preferred embodiments respectively, showing a non return valve construction incorporated in the fourth preferred embodiment of the portless type master cylinder device of the present invention.

The non return valve construction 34 incorporated in the fourth preferred embodiment of the portless type master cylinder device of the present invention is shown in FIG. 6, in a similar manner to said portion of FIG. 2 relating to the first preferred embodiment and to FIGS. 4 and 5 relating to the second and third preferred embodiments. Again, in this figure, parts and gaps and spaces and so on of this fourth preferred embodiment which correspond to analogous parts and gaps and spaces and so on of the first through the third preferred embodiments are denoted by reference numerals like to those utilized in the figures relating to said first through third preferred embodiments.

In this fourth preferred embodiment the restricted orifice 41 incorporated in the non return valve construction 34 is no longer formed on or in or through the valve element 38 thereof at all, but rather is formed as an independent passage 51 bypassing said valve element 38 and leading from the second reservoir connection chamber 17 directly to the reservoir connection port 25. The same effects and benefits are obtained in this fourth preferred embodiment of the portless type master cylinder device of the present invention, as were obtained in the case of the first through the third preferred embodiments described earlier.

THE FIFTH PREFERRED EMBODIMENT

The fifth preferred embodiment of the portless type master cylinder device of the present invention is shown in FIG. 6, in a similar manner to FIG. 1 relating to the first preferred embodiment. This fifth preferred embodiment portless type master cylinder device again is a tandem type master cylinder for use with a dual type braking system of a vehicle. Again, in this figure, parts and gaps and spaces and so on of this fifth preferred embodiment which correspond to analogous parts and gaps and spaces and so on of the first through the fourth preferred embodiments are denoted by reference numerals like to those utilized in the figures relating to said first through fourth preferred embodiments.

Figure 7:
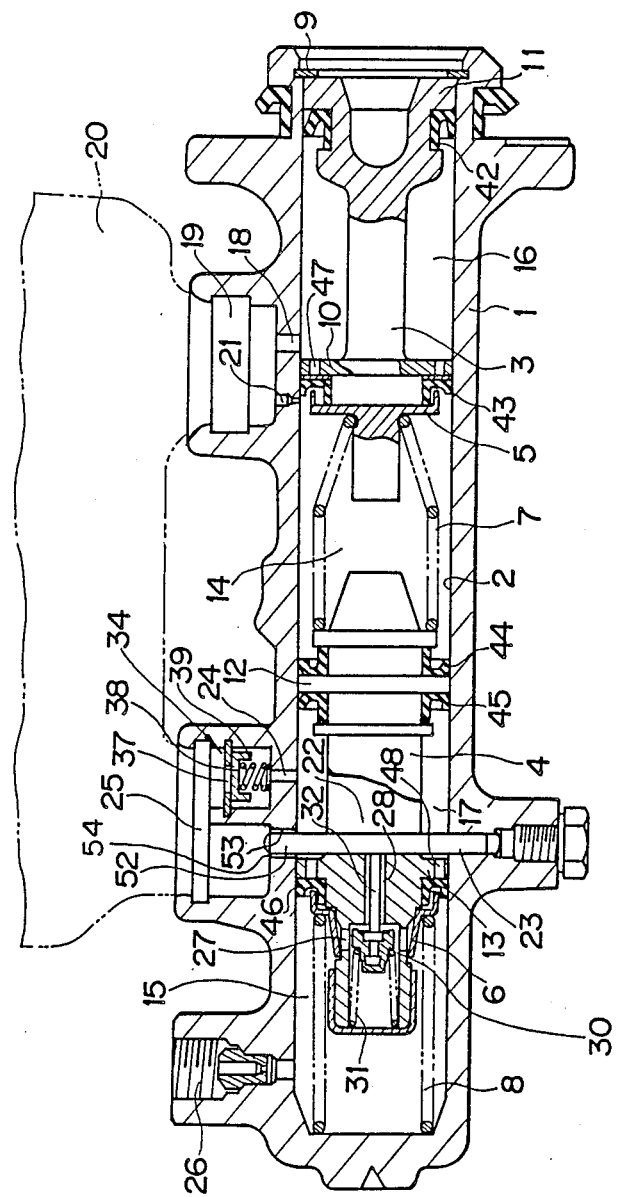
FIG. 7 is a longitudinal sectional view, similar to FIG. 1 for the first preferred embodiment, showing the fifth preferred embodiment of the portless type master cylinder device of the present invention, which again is a tandem type master cylinder for use with a dual type braking system of a vehicle.

In this fifth preferred embodiment the restricted orifice 41 is no longer directly incorporated in the non return valve construction 34 at all. On the contrary, in this fifth preferred embodiment, the stopper pin 23 is formed as extending completely across the cylinder bore 2, with its lower end as seen in FIG. 7 firmly screwingly fixed into the body 1 of the master cylinder device, and with its other end 52 fitting into a hole 53 formed through the side wall of said cylinder bore 2 and opening to a plenum leading to the reservoir connection port 25. The end 52 of the stopper pin 23 cooperates relatively closely with this hole 53 so as to define a restricted orifice means 54 which communicates the second reservoir connection chamber 17 with the reservoir connection port 25 with a relatively extremely high fluid flow resistance, in parallel with the non return valve construction 34 which may be of any of the types disclosed above (of course excluding the restricted orifice 41). Thereby, this restricted orifice means 54 fulfills the function of the restricted orifice 41 of the first and second preferred embodiments, and accordingly the same effects and benefits are obtained in this fifth preferred embodiment of the portless type master cylinder device of the present invention, as were obtained in the case of the first through the fourth preferred embodiments described earlier.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A portless type master cylinder device, comprising:
   (a) a body within which is formed a cylinder bore;
   (b) a piston member which is fitted in said cylinder bore and is slidably movable from an initial axial position therein and which defines a pressure chamber in cooperation with said cylinder bore;
   (c) a fluid reservoir;
   (d) an intake valve which communicates between said cylinder chamber and said fluid reservoir via a fluid flow path, and which is opened when said piston member is in its said initial axial position while it is closed when said piston member moves through more than a determinate relatively small axial distance from its said initial axial position; and
   (e) intermediately along said fluid flow path between said intake valve and said fluid reservoir, provided in parallel:
   (e1) a non return valve which allows substantially free flow of fluid from said fluid reservoir to said intake valve but substantially prevents flow in the reverse direction; and
   (e2) a means for allowing flow of fluid from said intake valve to said fluid reservoir with a relatively high flow resistance being presented to said flow;
   wherein said non return valve comprises a valve seat formed with a valve aperture, a valve element which cooperates with said valve seat to open or close said valve aperture, and a means for biasing said valve element away from said valve seat so as to open said valve aperture; said intake valve being provide on the side of said valve seat towards said valve element and said fluid reservoir being provided on the side of said valve seat away from said valve element; and wherein, when more than a relatively small volume of fluid flow occurs through said non return valve from the side of said intake valve towards said fluid reservoir, said fluid flow impels said valve element, against the action of said biasing means which is overcome, to press said valve element against said valve seat so as to close said valve aperture therein.

2. A portless type master cylinder device according to claim 1, wherein said means for allowing flow of fluid from said intake valve to said fluid reservoir with a relatively high flow resistance being presented to said flow is a relatively narrow passage formed in said valve element of said non return valve.

3. A portless type master cylinder device according to claim 2, wherein said relatively narrow passage formed in said valve element of said non return valve is an aperture formed through said valve element from its one side to its other side.

4. A portless type master cylinder device according to claim 2, wherein said relatively narrow passage formed in said valve element of said non return valve is a groove formed on the side of said valve element which cooperates with said valve seat and which permits a certain relatively small amount of leakage of said non return valve even when said valve element thereof is pressed against said valve seat thereof by said biasing means.

* * * * *